United States Patent [19]

Hubbard

[11] Patent Number: 4,729,639
[45] Date of Patent: Mar. 8, 1988

[54] DUAL FREQUENCY ADDRESSABLE LIQUID CRYSTALS AND METHODS OF USE
[75] Inventor: Robert L. Hubbard, Beaverton, Oreg.
[73] Assignee: Tektronix, Inc., Beaverton, Oreg.
[21] Appl. No.: 603,469
[22] Filed: Apr. 24, 1984

Related U.S. Application Data

[62] Division of Ser. No. 364,341, Mar. 29, 1982, abandoned.
[51] Int. Cl.$^4$ .......................... G02F 1/13; C09K 19/30
[52] U.S. Cl. .................................. 350/346; 252/299.5; 252/299.63; 252/299.64; 252/299.65; 252/299.66; 252/299.67
[58] Field of Search ................... 350/346; 252/299.63, 252/299.64, 299.65, 299.5, 299.67, 299.66

[56] References Cited

U.S. PATENT DOCUMENTS

| 4,222,887 | 9/1980 | Matsufuji | 252/299.63 |
| 4,229,315 | 10/1980 | Krause et al. | 252/299.63 |
| 4,237,026 | 12/1980 | Eidenschink et al. | 252/299.63 |
| 4,279,771 | 7/1981 | Shionozaki et al. | 252/299.63 |
| 4,287,085 | 9/1981 | Takei et al. | 252/299.63 |
| 4,290,905 | 9/1981 | Kande | 252/299.63 |
| 4,341,652 | 7/1982 | Takei et al. | 252/299.67 |
| 4,460,770 | 7/1984 | Petrzilka et al. | 252/299.01 |
| 4,483,595 | 11/1984 | Irving et al. | 252/299.63 |
| 4,559,161 | 12/1985 | Takei et al. | 252/299.63 |
| 4,566,759 | 1/1986 | McDonnell et al. | 252/299.64 |
| 4,609,256 | 9/1986 | Nakamura | 252/299.67 |

FOREIGN PATENT DOCUMENTS

| 83253 | 7/1983 | European Pat. Off. | 252/299.01 |
| 105701 | 5/1974 | Fed. Rep. of Germany | 252/299.63 |
| 55-21429 | 2/1980 | Japan | 252/299.63 |
| 55-29545 | 3/1980 | Japan | 252/299.03 |
| 55-84385 | 6/1980 | Japan | 252/299.63 |
| 56-68636 | 6/1981 | Japan | 252/299.63 |
| 56-118481 | 9/1981 | Japan | 252/299.63 |
| 57-5782 | 1/1982 | Japan | 252/299.63 |
| 57-5781 | 1/1982 | Japan | 252/299.63 |
| 57-5780 | 1/1982 | Japan | 252/299.63 |
| 57-34176 | 2/1982 | Japan | 252/299.63 |
| 57-21479 | 2/1982 | Japan | 252/299.63 |
| 58-65783 | 4/1983 | Japan | 252/299.63 |
| 58-118884 | 7/1983 | Japan | 252/299.63 |
| 58-142961 | 8/1983 | Japan | 252/299.63 |
| 58-142966 | 8/1983 | Japan | 252/299.63 |
| 58-142965 | 8/1983 | Japan | 252/299.63 |
| 58-142959 | 8/1983 | Japan | 252/299.63 |
| 82/00654 | 3/1982 | PCT Int'l Appl. | 252/299.63 |
| 2085910 | 5/1982 | United Kingdom | 252/299.63 |
| 2097418 | 11/1982 | United Kingdom | 252/299.63 |
| 2114994 | 9/1983 | United Kingdom | 252/299.67 |

Primary Examiner—Teddy S. Gron
Attorney, Agent, or Firm—John D. Winkelman; William S. Lovell; Richard J. Polley

[57] ABSTRACT

A twisted nematic liquid crystal material used in a dual-frequency addressable liquid crystal cell is disclosed. Specific materials include an eutectic mixture of 2–5 monoester compounds having the formula R—X—Y—$CO_2$—Z—R', wherein R and R' is a straight alkyl having 2–7 carbon atoms and where each of X, Y and Z is a phenyl or trans-cyclohexyl and at least one of X, Y and Z is a trans-cyclohexyl. Also included are up to 25 weight percent of dopants to reduce viscosity and up to 10 weight percent of additives to lower the cross-over frequency, the additives being of the formula:

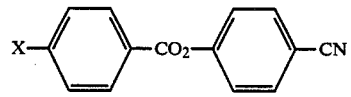

wherein X is selected from the group consisting of:

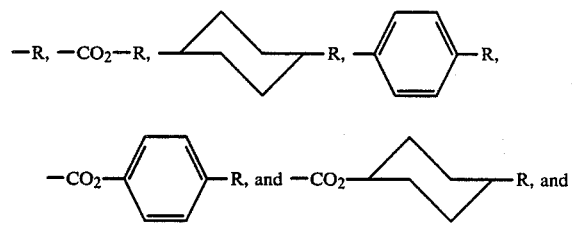

wherein R is a straight alkyl having 2–7 carbon atoms.

13 Claims, 12 Drawing Figures

DUAL FREQUENCY ADDRESSABLE LIQUID CRYSTALS AND METHODS OF USE

This is a division, of application Ser. No. 363,341, filed Mar. 29, 1982, now abandoned.

SUMMARY OF THE INVENTION

The present invention relates to liquid crystal display systems. More specifically, it relates to liquid crystal compositions for use in dual frequency addressable liquid crystal cells.

Liquid crystal materials are mixtures of long organic molecules which align uniformly when in the presence of an electro-magnetic field. A typical liquid crystal cell has two parallel electrodes with a liquid crystal material disposed therebetween so that when a signal of a sufficient voltage within a predetermined frequency range is applied to the electrode pair, the molecules align perpendicular to the plane of electrodes. Because the liquid crystal material has different optical properties when the molecules are aligned, liquid crystal cells are useful in the manufacture of display devices.

It is known that some liquid crystal materials will behave differently depending on the frequency of the electric field. For such materials, an electric field at a first frequency will cause the molecules to align perpendicular to the plane of electrodes, whereas an electric field at a second and higher frequency will cause the molecules to align parallel to the plane of the electrodes. The frequency at which the molecules are equally influenced to align perpendicularly and horizontally is called the cross-over frequency. Under the influence of an electric field having a frequency less than the cross-over frequency, the material has positive dielectric anisotropy. In a field above the cross-over frequency, the material has a negative dielectric anisotropy.

Such liquid crystal materials can be driven rapidly between two optical conditions by alternately applying electric fields at above and below the cross-over frequency. The construction and operation of such dial-frequency addressable liquid crystal cells is discussed in United Kingdom Patent No. 1,463,979, U.S. Pat. No. 4,236,150, and the following articles:

Schadt, M., *J. Chem. Phys.*, 56 (4), 1494 (1972);
DeJeu, W. H. et al., *Phys. Lett.*, 39 (5), 355 (1972); Baur, G., Steib, A. Meier, G., *Liquid Crystals a Ordered Fluids* 3, 645, Plenum Press (1973);
DeJeu, W. H. and Lathuwers, Th. W., *Mol. Cryst. Liq. Cryst.*, 26, 225 (1974);
Bak, C. S., Ko, K., and Labes, M. M., *J. App. Phys.*, 46, (1), 1 (1975);
Clark, M. G. and Harrison, K. J., *SID International Symposium Digest*, 12, 82 (1981);

The dual-frequency addressable liquid crystal materials discussed in such references are mixtures that include, primarily, rod-like molecules, primarily mono and diesters, having two or more phenyls. The liquid crystal materials most frequently studied have been three mixtures manufactured by E. Merck, Darmstat, designated as W1, ZLI-518, and ZLI-1085.

Certain mixtures of molecules are dual frequency addressable liquid crystal materials in that they have a characteristic cross-over frequency sufficiently low that they can be driven "on" by a low frequency electrical field, and can also be driven "off" by an electric field at a frequency higher than the cross-over frequency. But, prior materials are not well suited for use in display devices where very rapid switching between the "on" and "off" conditions is desired.

Since the rise time of liquid crystals is inversely proportional to the square of the electric field, the rise times of these prior mixtures can be shortened to a millisecond by the use of a high voltage electric field. The fall time can be reduced to a millisecond by using a high frequency drive. But, to operate at such high frequencies and at high voltage, it is necessary to use undesireably complex and costly power supply circuitry.

It is a further problem of all prior materials that they cannot be operated at a rapid switching rate for sustained periods of time. This is because heat generated during operation causes an upward shift of the material's cross-over frequencies. The above-described dual-frequency addressable liquid crystal materials, such as those of E. Merck, had cross-over frequencies ($f_c$) of around ten kHz at 26° C. To drive such dual-frequency addressable liquid crystal materials to the "off" condition at room temperature, it is necessary to use a high frequency drive capable of operating at 20 kHz and 50 V RMS.

In operation, such a high frequency drive would produce sufficient current to heat the liquid crystal cell, which would shift the cross-over frequency higher, as shown in FIG. 1 which shows the effect of temperature on ZLI-1085. Within a short time, a signal at 20 kHz would no longer be capable of switching the liquid crystal to an "off" condition. Thus, to make an operable dual-frequency addressable liquid crystal cell using this material, it would be necessary either to provide a costly and impractical cooling mechanism, or to compensate for the shift by continuously increasing the frequency of the signal applied. The latter approach is taken in U.S. Pat. No. 4,236,150 (Chern). But, it is not practical to increase the frequency indefinitely. For example, increasing the frequency of the electric field to, for example, 50 kHz, would raise the temperature even more, which would cause a further upward shift of the cross-over frequency, etc.. Continued escalation of the frequency would merely increase the amount of heat produced to the point where the cell could not be switched "off" at all.

In one document, Osakawa M., Kanabe, S., Nagata, M., and Nakamura, H., *SID International Symposium Digest*, 10, (1979), the problem of cross-over frequency dependence on temperature, and the requirements for relative high voltage operation are discussed. The authors report having developed a new dual-frequency addressable liquid crystal material that at least partially solves these problems. But, the article does not disclose the composition of the material.

It is now discovered that the difficulties of prior art dual-frequency addressable liquid crystal cells are overcome by the use of certain new dual-frequency addressable liquid crystal materials. These new materials have such low cross-over frequencies (1-5 kHz) that they can be operated with a negligible amount of heat production. The materials have high clearing points (130°-150° C.) and wide temperature ranges (over 100° C.). Practical liquid crystal cells containing such materials have been run continuously for days at 40° C. with a two kHz high frequency drive, operating with a response time of less than a millisecond. Using these materials, it is possible to build liquid crystal display devices that can be operated over long periods of time using an electric field of relatively low voltage and frequency. As an additional benefit, the new materials have a low birefringence, i.e., wider viewing angle, than prior dual frequency addressable liquid crystal materials.

These materials have useful dielectric properties uniquely suited for dual-frequency addressable displays. By adjusting the composition of such liquid crystal materials, it is possible to obtain a liquid crystal material with dielectric properties to suit many specific applications.

Liquid crystal materials of the present invention are mixtures that include at least one, but preferably an eutectic mixture of two to five, rod-like monoester molecules having between 23 and 33 carbon atoms and including at least three carbon rings, at least one of the rings being trans-cyclohexyl. Such molecules are illustrated by the formula:

$$R-X-Y-CO_2-Z-R' \qquad (I)$$

wherein each of R and R', which may be the same or different, is an alkyl having two to seven carbon atoms, and each of X, Y and Z, which may be the same or different, is a phenyl or trans-cyclohexyl, at least one of X, Y and Z being trans-cyclohexyl.

Advantageously, the new liquid crystal materials will include an additive material which is present in a sufficient amount to lower the cross-over frequency of the mixture of base molecules, and to increase the anisotropy of the mixture. In many materials, it is also necessary to include a dopant in an amount sufficient to reduce the viscosity and melting point of the material to usable levels.

One particular class of compounds having uniquely beneficial properties for use in the eutectic mixture are compounds of the formula:

wherein each of R and R', which may be the same or different, is an alkyl having one to ten carbon atoms.

It is an object of the invention to provide a dual-frequency addressable liquid crystal material that can operate continuously for long periods of time at room temperature or above.

A further object is to provide such materials which can be switched between "on" and "off" conditions in less than a millisecond.

Another object is to provide such materials having a low cross-over frequency, and high clearing point.

A further object is to provide such materials with a low birefringence for a wide viewing angle.

Also an object is to provide specific compounds that are uniquely advantageous when included in dual-frequency addressable liquid crystal materials.

These and other objects, features and advantages of the invention can best be understood by reference to the following detailed description taken in connection with the accompanying drawings.

DETAILED DESCRIPTION

Figure 1:
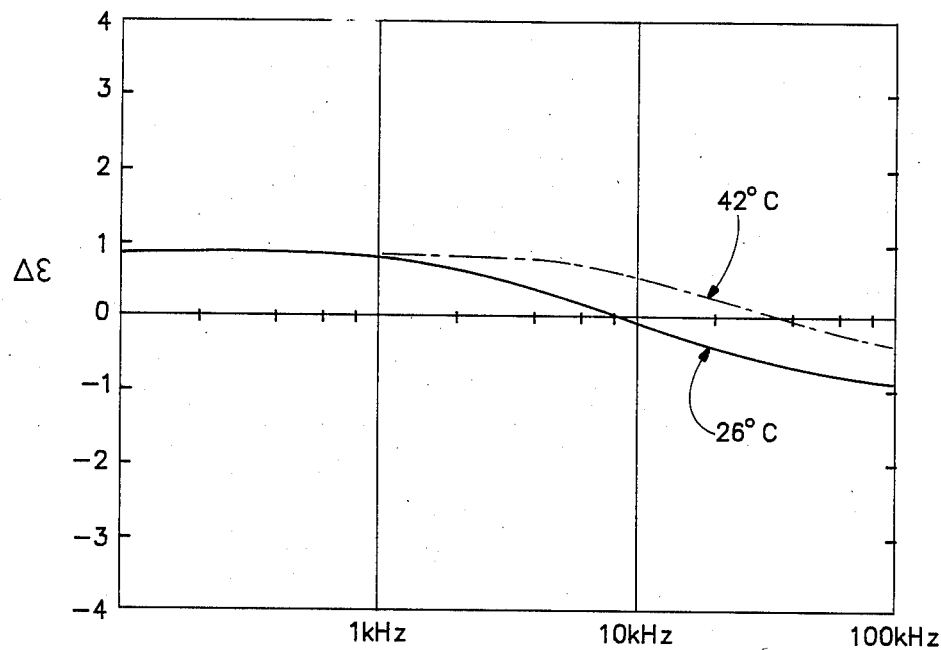
FIG. 1 is a graph showing dielectric anisotropy versus frequency, for a prior art material, at two different temperatures.

Dual-frequency addressable twisted nematic liquid crystal cells according to the invention contain a liquid crystal material which includes an eutectic mixture of rod-like mono- and diester molecules. This mixture of base components includes at least one, but much more preferably, two to five monoester compounds that have between 23 and 33 carbon atoms and that include three six-carbon rings, at least one of which is trans-cyclohexyl. To the eutectic mixture, as required to lower the cross-over frequency and increase the anisotropy of the material, is added an amount of an additive material that has a strong positive dielectric anisotropy. Also added, as needed, is a dopant in an amount sufficient to reduce viscosity and melting point of the materials to usable levels. For liquid crystal materials to be operated at room temperature, both an additive material and a dopant are likely to be needed; no other substances, such as those of Formula II, are required.

Specific compounds mentioned hereafter were either obtained from EM Labs (E. Merck, Darmstadt), Hoffman-LaRoche, Inc. or synthesized. Thermal data was collected with a Perkin-Elmer DSC-2, and checked with polarized microscopy. Synthesized components were identified by proton and carbon FT-NMR, as well as Infrared spectroscopy. Compounds were purified with a Waters preparative liquid chromatograph using hexane, ethyl acetate, and THF followed by recrystalization. Refractive indices were measured with an Abbe refractometer with oriented surfaces.

Dielectric constants were obtained using a Princeton Applied Research lock-in amplifier and preamp to measure the capacitance of a 255-micron thick layer of the liquid crystal parallel and perpendicular to a 12 kGauss magnetic field at a temperature of 26° C. Lowering the magnetic field had no appreciable effect on capacitance, and the results were reproducable to within two percent. The parallel and perpendicular dielectric constants were calculated and plotted on a Tektronix 4051.

Base Components

The bulk of the liquid crystal materials according to this invention is made up of a base mixture of between two and five different base substances, at least one of which is selected from the group of monoester compounds having the formula:

$$R-X-Y-CO_2-Z-R' \qquad (I)$$

wherein each of R and R', which may be the same or different, is a straight alkyl having two to seven carbon atoms; and wherein X and Y, which may be the same or different, is a member selected from the group consisting of phenyl and trans-cyclohexyl, at least one of X, Y and Z being trans-cyclohexyl. Most preferably, the base mixture will comprise between two and five cyclohexyl esters of Formula I and no other components.

Specific cyclohexyl ester compositions according to Formula I, are listed in Table I as Formulas Ic-Ii.

TABLE I
BASE COMPONENTS (Ia)[a]

R—CO$_2$—〈phenyl〉—CO$_2$—〈phenyl〉—R'

| R | R' | mp | np | cp | Component No. |
|---|---|---|---|---|---|
| C$_5$H$_{11}$ | C$_3$H$_7$ | 38 | | 53 | 2006 |
| C$_5$H$_{11}$ | C$_7$H$_{15}$ | 38 | | 61 | 2009 |
| C$_5$H$_{11}$ | C$_5$H$_{11}$ | 37 | | 57 | 2003 |
| C$_5$H$_{11}$ | C$_4$H$_9$ | 37 | | 48 | 2004 |
| C$_3$H$_7$ | C$_5$H$_{11}$ | 55 | | 59 | 2005 |

(Ib)[b]

R—〈phenyl〉—〈phenyl〉—CO$_2$—〈phenyl〉—R'

| R | R' | mp | np | cp | Component No. |
|---|---|---|---|---|---|
| C$_5$H$_{11}$ | C$_5$H$_{11}$ | 95 | | 176 | 1011 |

(Ie)[c]

R—〈cyclohexyl〉—〈cyclohexyl〉—CO$_2$—〈cyclohexyl〉—R'

| R | R' | mp | np | cp | Component No. |
|---|---|---|---|---|---|
| C$_5$H$_{11}$ | C$_5$H$_{11}$ | 43 | | 184 | 2029 |

(If)

R—〈cyclohexyl〉—〈cyclohexyl〉—CO$_2$—〈phenyl〉—R'

| R | R' | mp | np | cp | Component No. |
|---|---|---|---|---|---|
| C$_5$H$_{11}$ | C$_5$H$_{11}$ | 26 | 175 | 185 | 2032 |
| C$_3$H$_7$ | C$_5$H$_{11}$ | 29 | 150 | 185 | 2042 |

(Ig)[d]

R—〈phenyl〉—〈phenyl〉—CO$_2$—〈cyclohexyl〉—R'

(Ih)[e]

R—〈phenyl〉—〈cyclohexyl〉—CO$_2$—〈phenyl〉—R'

(Ii)

R—〈phenyl〉—〈cyclohexyl〉—CO$_2$—〈cyclohexyl〉—R'

(Ic)[c]

R—〈cyclohexyl〉—〈phenyl〉—CO$_2$—〈phenyl〉—R'

| R | R' | mp | np | cp | Component No. |
|---|---|---|---|---|---|
| C$_3$H$_7$ | C$_3$H$_7$ | 71 | 89 | 186 | 1222 |
| C$_3$H$_7$ | C$_4$H$_9$ | 90 | | 173 | 2021 |
| C$_3$H$_7$ | C$_5$H$_{11}$ | 82 | | 171 | 2019 |
| C$_3$H$_7$ | C$_7$H$_{15}$ | 58 | 99 | 162 | 2022 |
| C$_4$H$_9$ | C$_5$H$_{11}$ | 77 | 115 | 167 | 2028 |
| C$_5$H$_{11}$ | C$_3$H$_7$ | 72 | 92 | 179 | 2014 |
| C$_5$H$_{11}$ | C$_4$H$_9$ | 73 | 129 | 169 | 2017 |
| C$_5$H$_{11}$ | C$_5$H$_{11}$ | (72) | (137) | 170 | 2010 |
| C$_5$H$_{11}$ | C$_6$H$_{13}$ | 60 | 136 | 160 | 2027 |
| C$_5$H$_{11}$ | C$_7$H$_{15}$ | (45) | 139 | 161 | 2011 |
| C$_5$H$_{11}$ | C$_5$H$_{11}$O | 27 | 147 | 187 | 2025 |

(Id)[c]

R—〈cyclohexyl〉—〈phenyl〉—CO$_2$—〈cyclohexyl〉—R'

TABLE I-continued
BASE COMPONENTS

| R | R' | mp | np | cp | Component No. |
|---|---|---|---|---|---|
| C$_2$H$_5$ | C$_3$H$_7$ | 39 | 94 | 134 | 1232 |
| C$_3$H$_7$ | C$_3$H$_7$ | (92) | | 159 | 1224 |
| C$_4$H$_9$ | C$_3$H$_7$ | | | 155 | 1273 |
| C$_5$H$_{11}$ | C$_3$H$_7$ | 67 | | 154 | 1223 |

[a] E. Merck, Darmstadt
[b] Inukai, Takashi, (Chisso Corp.); West German patent No. 2,545,121, dated April 22, 1976.
[c] R. Eidenschink, D. Erdmann, J. Krause, L. Pohl, (E. Merck); 7th International Liquid Crystal Conference, Bordeaux, France, 1978.
[d] Yawajak, Yoshio (Suwa Seikosha Co. Ltd.) Japanese Patent No. 79 69 178, dated January 23, 1979.
[e] Karamysheva, LA (Org. Intermediaries Dies Inst. Moscow USSR), Mol. Cryst. Liq. Cryst. 1976, 37 (1-4) 29; (Canon K.K.); Japanese patent No. 79 21 978, dated 1979.

The cyclohexyl esters of Formulas Ic–Ii have a lower birefringence than molecules which were used in prior dual-frequency addressable liquid crystal materials. These substances also exhibit inherently lower dielectric relaxation frequencies, as well as higher clearing points.

Table I lists two other structures, designated as Ia and Ib. These and other similar materials that do not have a cyclohexyl can be included in a base mixture according to the present invention, but are not preferred. For example, compounds according to Formula Ia have the advantage of low viscosity, but have relatively high cross-overs and high birefringence. If a base mixture includes substances selected from both Formulas Ia–Ib and Formulas Ic–Ii, the base mixture will have a greater birefringence and a higher dielectric relaxation frequency than base mixtures containing only the cyclohexyl ester molecules of Formulas Ic–Ii.

Best results are achieved when the base mixtures are eutectic mixtures. Such mixtures may be formulated according to the Schroeder-Van Larr equations correcting to weight percent. To a base mixture, other substances can be added as described below.

Not every substance according to Formula I can be used in a base mixture, Among each series of homologous components some might be unusable. A number of homologs have either several irreproducable solid phases, small unstable nematic phases, or produced solutions instead of eutectics. For some of these compounds, no percentage could be found that was compatible in mixtures. The difficulties are illustrated in Table I, which states melting points (mp), nematic points (np) and clearing points (cp). Some of the data in Table I does not correspond to the published data furnished by the manufacturers. In several cases, it was found that the reported melting points was in fact a transition from smectic to nematic phase. There were cases where repeated thermal cycling produced anomalous results.

It is necessary to use only materials that have reproducable nematic phases, or in some cases, reproducable smectic phases. But, in all cases, a nematic point was used for the eutectic mixture calculations rather than the melting point.

There does not seem to be a significant relationship between alkyl chain length and cross-over frequency. Straight alkyls having two to seven carbon atoms are generally suitable. Although, in some instance, alkyls of from one to ten carbon atoms may be usable.

Figure 2:
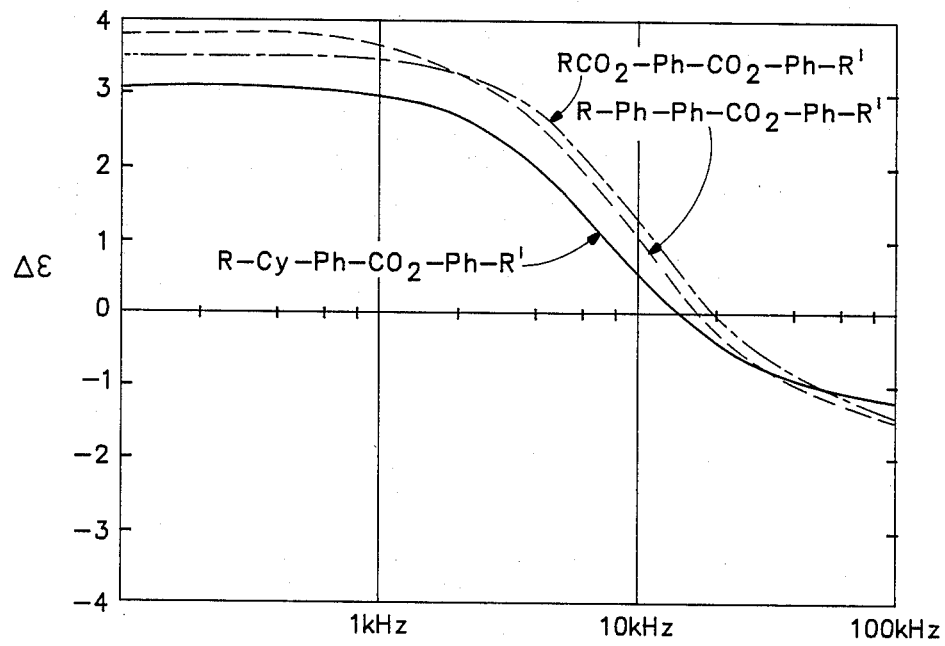
FIGS. 2–12 are graphs showing dielectric anisotropy versus frequency at 26° C. for various molecules and liquid crystal mixtures.

There was not much of an effect when an ester group of the composition of Formula Ia is replaced with a phenyl ring to produce a molecule of Formula Ib as shown in FIG. 2. The effect of substituting a cyclohexyl ring to produce a composition of Formula Ic was significant, as also shown in FIG. 2. The clearing point of the mixture was raised about 20° C. and the birefringence was lowered from 0.17 to 0.14. The cross-over frequency was lowered from 20 kHz to 15 kHz. There was no significant effect found from changing the alkyl groups.

Figure 3:
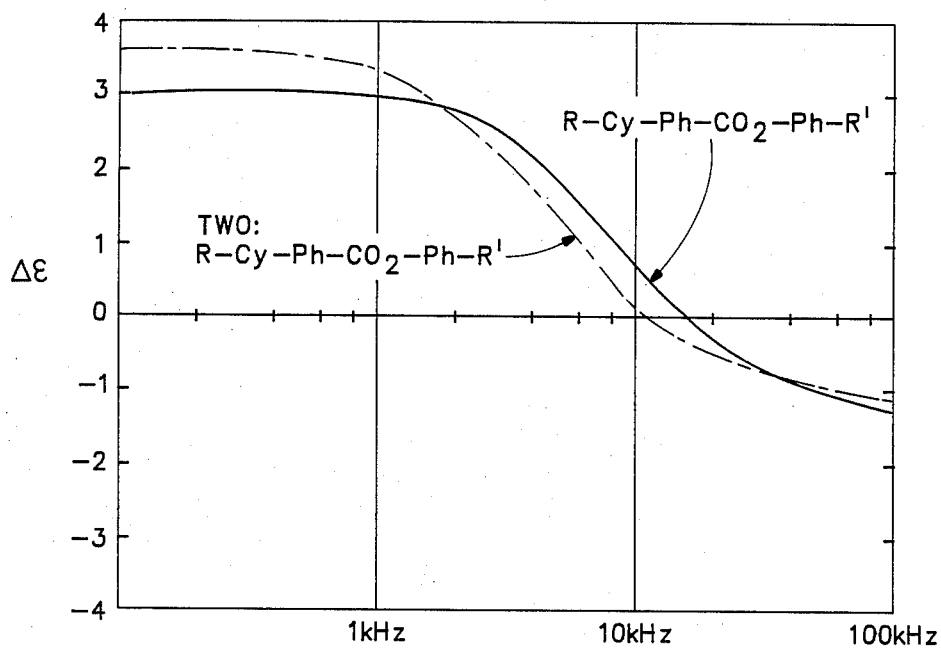

The synergistic effect of using mixtures of base substances is shown in FIG. 3. When two different Formula Ic homologs are mixed together, the cross-over frequency drops to 10 kHz.

Figure 4:
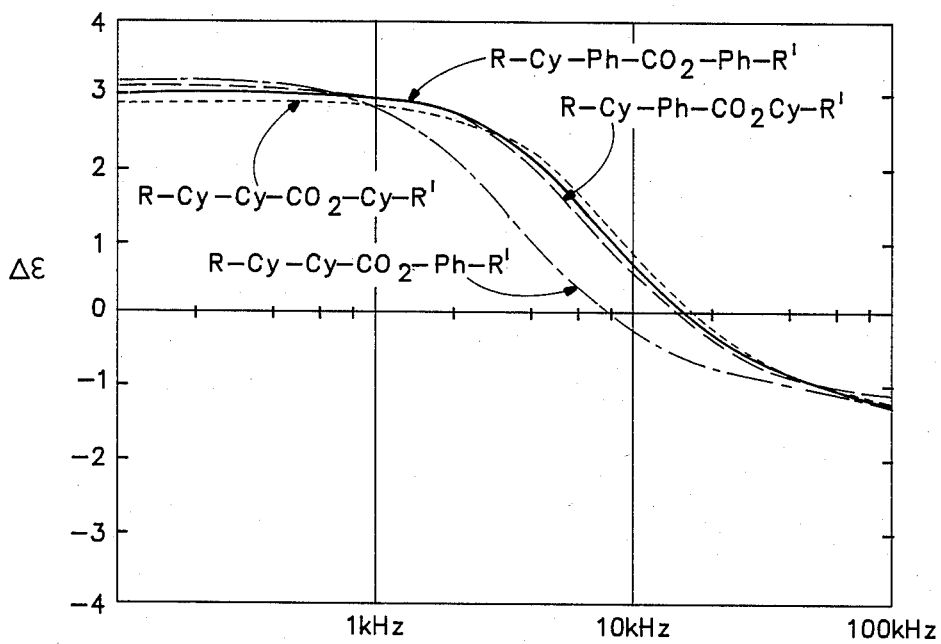

As shown in FIG. 4, there is no significant effect on the dielectric curve when the last phenyl ring of compositions according to Formula Ic is changed to cyclohexyl to produce the structure of Formula Id. Roughly the same result is obtained when all three rings are cyclohexyl according to Formula Ie.

Substances of Formula If were the first two rings are cyclohexyl and the last is phenyl, had a dramatically lower cross-over frequency.

Although only compounds of Formulas Ic–If were tested, the other cyclohexyl esters according to Formula V, i.e., those of Formulas Ig–Ii, are expected to have similar beneficial characteristics to those of Formulas Ic–If.

When a base mixture contains only substances of Formulas Ic–If, and presumably those of Formulas Ig–Ii, the birefringence is at the low level of 0.12, and the cross-over frequency is substantially below that of prior mixtures. But, the temperature range of such a base mixture is likely to be so high that it is necessary to add dopants to lower the melting point to below room temperature as discussed below.

Additives

Once a eutectic mixture of the base substances is formed, an additive component with a strong, positive dielectric anisotropy can be added to lower the cross-over frequency as well as increase the positive anisotropy at low frequencies. Liquid crystal materials according to the invention can include up to ten weight percent of additive compositions of the general formula:

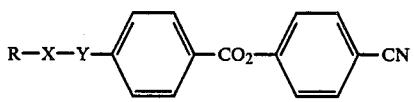

(II)

More specifically, the liquid crystal material should contain an effective amount up to ten weight percent of at least one additive select from the group having the formula:

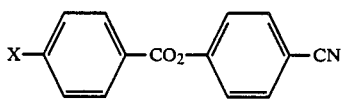

wherein X is selected from the group consisting of:

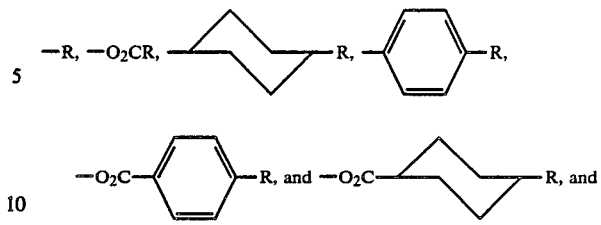

wherein R is a straight alkyl having 2–7 carbon atoms.

Table II lists the structures and thermal properties of such additive materials which are greatly preferred:

TABLE II
ADDITIVE SUBSTANCES

| R | mp | cp | Component No. |
|---|---|---|---|

(IIa)

| C4H9 | 66 | (42) | 1500$_a$ |
| C5H11 | 60 | (56) | 1530$_a$ |
| C7H15 | 43 | 56 | 1540$_a$ |

(IIb)

| C3H7 | 95 | 97 | 2001 |
| C5H11 | 66 | 68 | 2002 |
| C7H15 | 61 | 86 | 2007 |

(IIc)

| C5H11 | 82 | 222 | 2016 |

(IId)

| C5H11 | 97 | 221 | 2026 |

(IIe)

| H | | | 2035 |
| C3H7 | 109 | 257 | 2033 |
| C4H9 | 124 | 192 | 2008 |
| C5H11 | 76 | 119 | 2012 |
| C6H13 | | | 2039 |
| C7H15 | 56 | 109 | 2037 |
| C2H5O | | 153 | 2038 |
| C3H7O | 78 | 144 | 2040 |
| C4H9O | 122 | | 2024 |
| C5H11O | | | 2041 |
| C6H13O | 127 | 247 | 1339 |

(IIf)

TABLE II-continued

| ADDITIVE SUBSTANCES | | | |
|---|---|---|---|
| R | mp | cp | Component No. |
| C5H11 | 80 | 217 | 2020 |

[a]Hoffmann-La Roche

Of the substances listed in Table II, it was found that components of Formula IIe were the best of the additives for reducing the cross-over frequency, and that generally, the longer the molecule and the more extended the unsaturation, the lower the cross-over tended to be. The compounds of Formula IIe are synthesized by successive esterifications of n-alkyl benzoic acid, p-hydroxybenzoic acid and p-cyanophenol.

Figure 5:
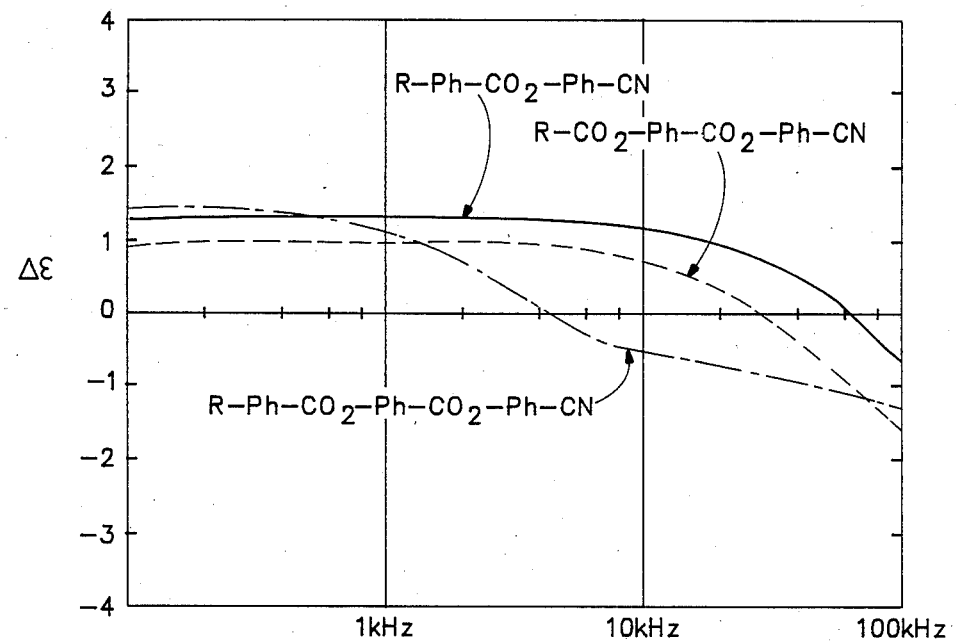
Figure 6:
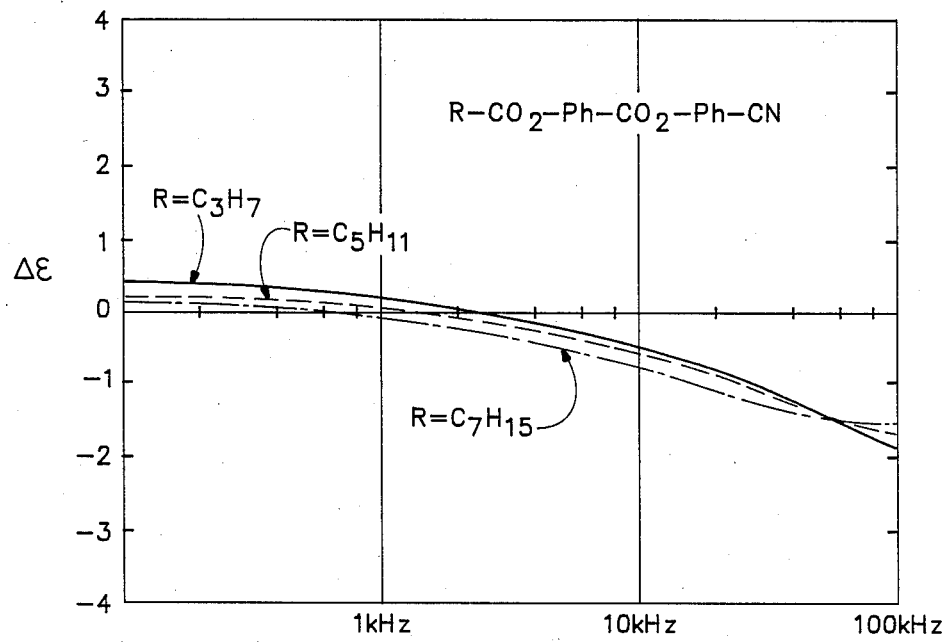
Figure 7:
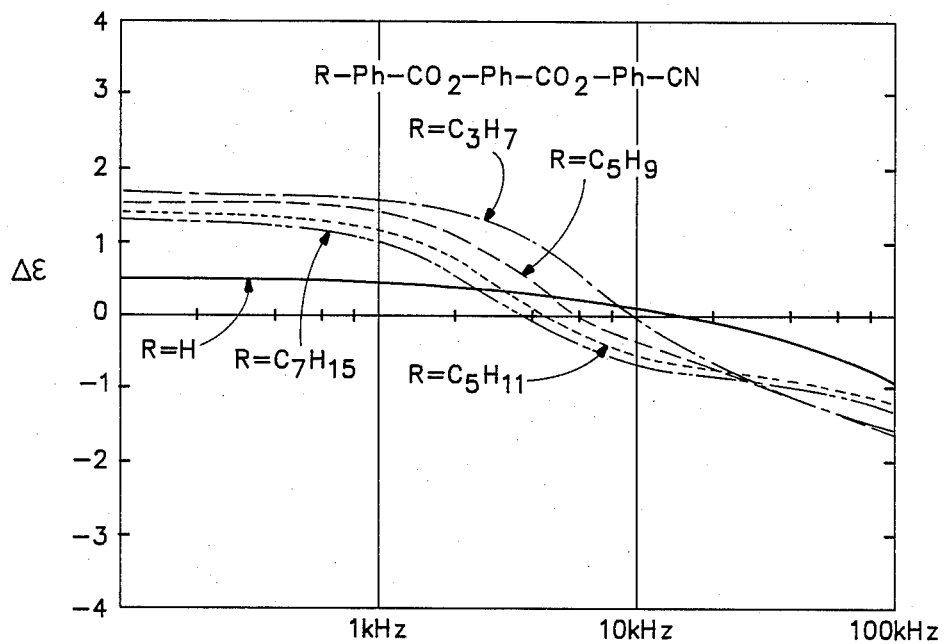
Figure 8:
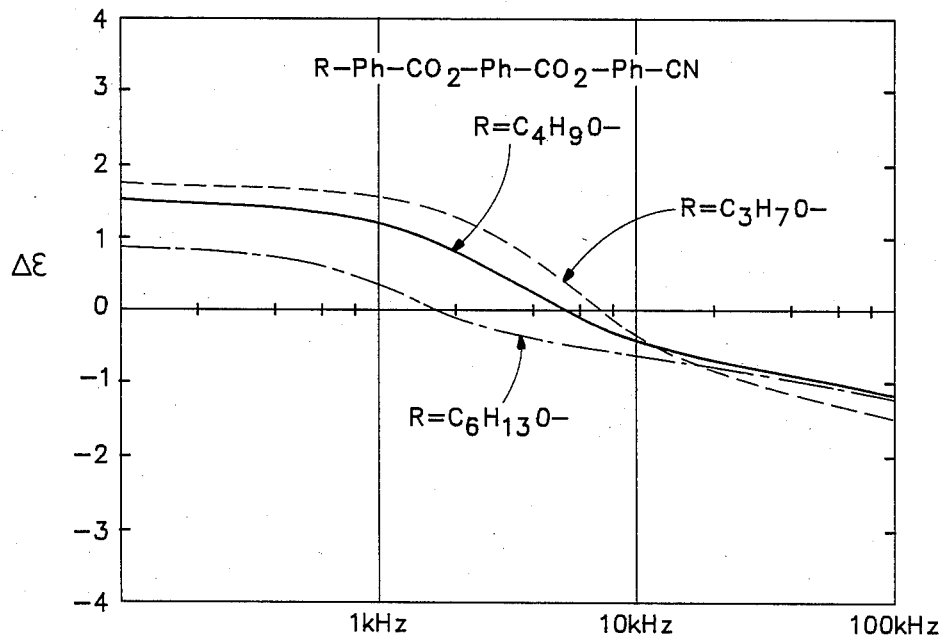
Figure 9:
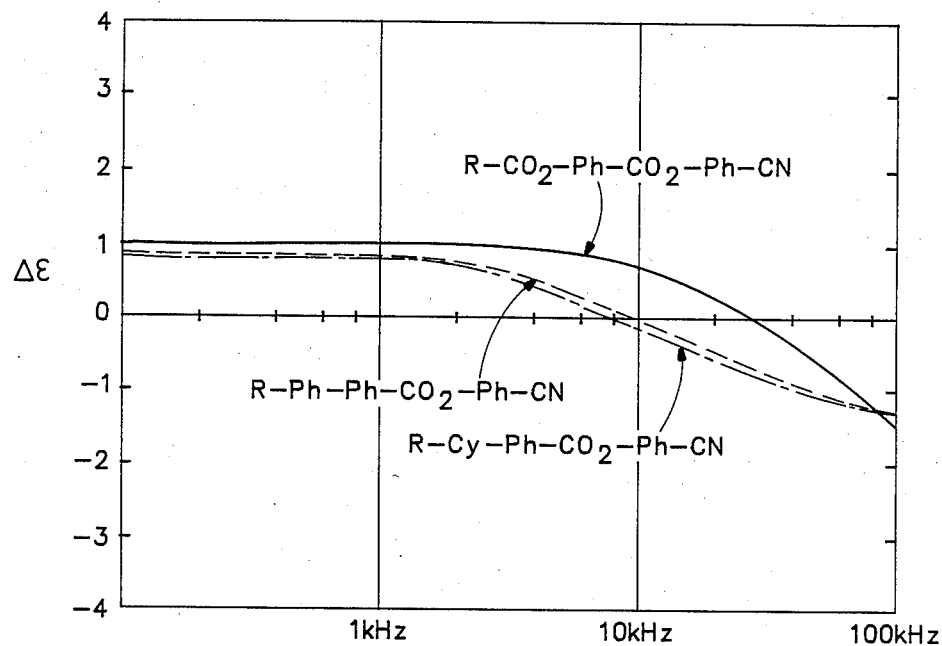

FIG. 5 shows the effect of extending the length of the rigid nucleus of additives of Formulas IIa–IId. FIGS. 6, 7 and 8 show the effect of lengthening the alkyl chain in the families. As shown in FIG. 9, the replacement of the ester functionality of Formula IIb with a ring as in Formula IIc, decreases the cross-over as well as slightly lowers the overall anisotropy. The replacement of the first phenyl ring of Formula IId with a cyclohexyl ring of Formula IIc shortens the conjugation and lowers the cross-over somewhat.

Dopants

It was necessary in many cases to reduce the viscosity and melting point of the base mixtures by the addition of smaller components with appropriate thermal behavior. A variety of such materials are known and should be included in an effective amount up to 25 weight percent. Examples of components used successfully in liquid crystal materials according to the present invention are those of the formulas:

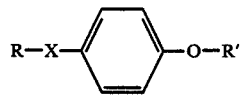

(III)

and $$R-X-CO_2-Y-R' \quad (IV)$$

wherein each of R and R′, which may be the same or different, is a straight alkyl having 2–7 carbon atoms; and wherein X and Y, which may be the same or different, is a member selected from the group consisting of phenyl and trans-cyclohexyl.

Examples of such materials appear in Table III.

TABLE III

| DOPANTS | | | | |
|---|---|---|---|---|
| R | R′ | mp | cp | Component No. |
| (IIIa)[a] | | | | |
| C5H11 | C6H13 | 82 | 84 | 1009 |
| C5H11 | C2H5 | 72 | 81 | 1010 |
| (IIIb)[a] | | | | |

TABLE III-continued

| DOPANTS | | | | |
|---|---|---|---|---|
| R | R′ | mp | cp | Component No. |
| C3H7 | C2H5 | 41 | (37) | 1476 |
| C3H7 | C4H9 | 35 | (32) | 1477 |
| (IVa) | | | | |
| C3H7 | C5H11 | | | 2036 |
| (IVb) | | | | |
| C3H7 | C5H11 | 17 | 35 | 2023 |
| C5H11 | C5H11 | 33 | 46 | 2013 |
| (IVc) | | | | |
| C3H7 | C5H11 | (50) | 65 | 2030 |
| C5H11 | C3H7 | 22 | 51 | 2018 |
| (IVd) | | | | |
| C3H7 | C5H11 | | 16 | 2031 |
| C5H11 | C3H7 | −5 | 22 | 2015 |

[a]e. Merck, Darmstadt

Figure 10:
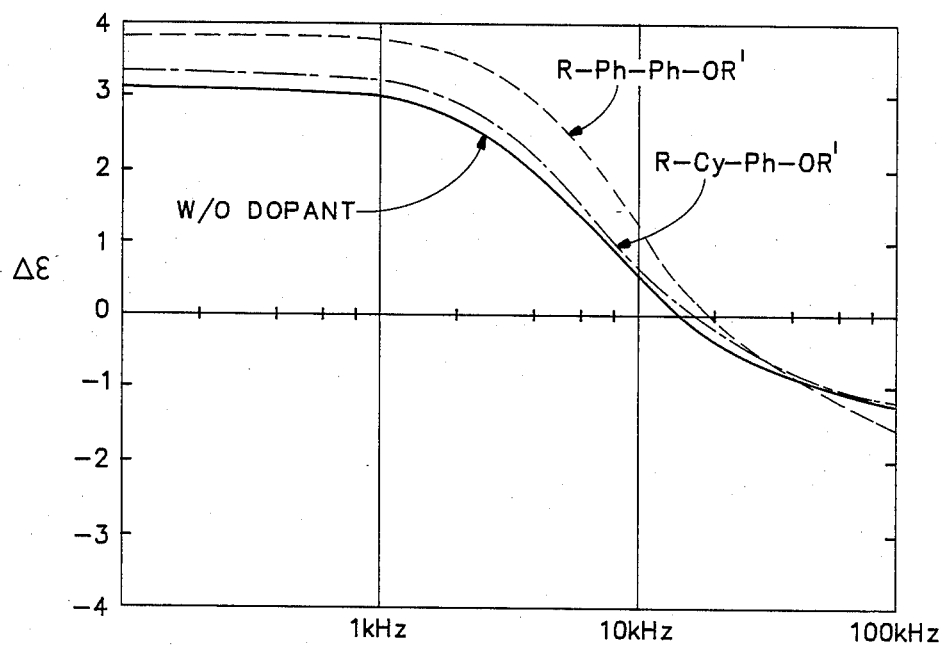

The choice of dopants was determined on the basis of the least deleterious effect on cross-over frequency. The compounds of Formula IIIa only increased the cross-over frequency by about ten percent while reducing the viscosity by a factor of two at dopant levels of about ten weight percent. Substances of Formula IIIb having a cyclohexyl ring substituted for the first phenyl ring of Formula IIIa, had a cross-over that was slightly worse, as shown in FIG. 10.

Figure 11:
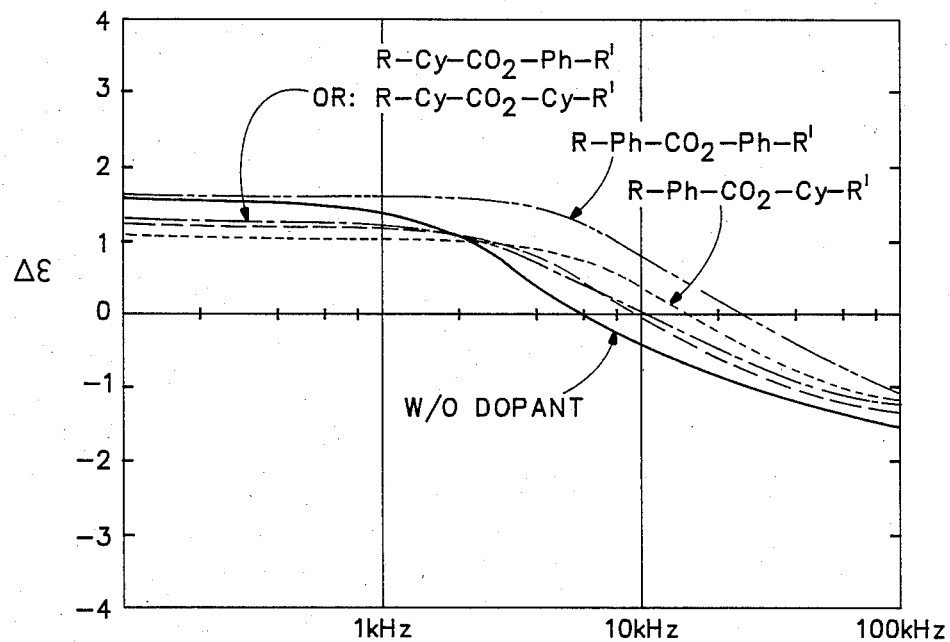
Figure 12:
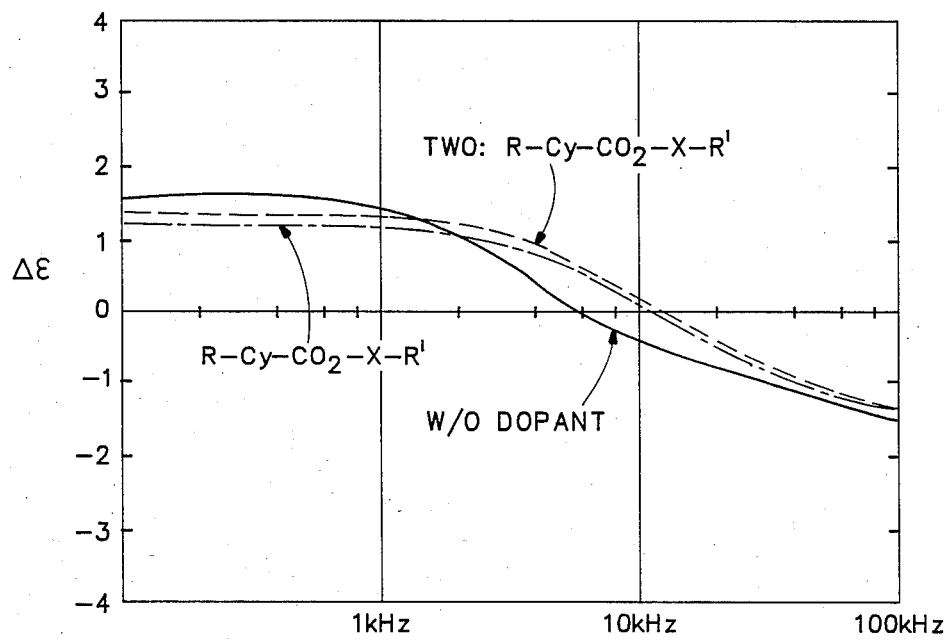

Even lower melting points are obtained by adding the ester compounds of Formula IV. The best results were achieved with a cyclohexyl acid ring and either a phenyl, as in Formula IVb, or a cyclohexyl alcohol ring, as in Formula IVc. A comparison of these materials is shown in FIG. 11. Using such ester components, viscosities were lowered to about 50 cp, and melting points were lowered below 0° C. Fortunately, as shown in FIG. 12, it is possible to add several of these components to a liquid crystal mixture without increasing the cross-over more than is expected from the addition of only one additive material.

EXAMPLE 1

A first liquid crystal material according to the present invention is a mixture of the following substances:

| | wt. % |
|---|---|
| Base substances: | |
| 2010 | 24.7 |
| 1232 | 22.3 |

-continued

| | wt. % |
|---|---|
| 1223 | 22.7 |
| 1222 | 15.3 |
| Additive: | |
| 2012 | 5.0 |
| Dopants: | |
| 2013 | 5.0 |
| 2015 | 5.0 |

This liquid crystal material was formed by mixing the listed components and was tested in a liquid crystal cell. The liquid crystal material had good dielectric properties with anisotropy (Δε) of −1.3 to +1.3 and a cross-over frequency of 1.8 kHz at 26° C. It could be switched between "on" and "off" conditions in less than a millisecond. The test cell was operated continuously for a period of several days at 40° C. with low frequency signals at 300 Hz and high frequency signals of 2 kHz.

EXAMPLE 2

A second composition according to the present invention is a liquid crystal of the following composition:

| | wt. % |
|---|---|
| Base substances: | |
| 1222 | 18.6 |
| 1223 | 28.0 |
| 2032 | 5.1 |
| 2017 | 27.3 |
| Additive: | |
| '2037 | 5.0 |
| Dopants: | |
| 2018 | 8.0 |
| 2013 | 8.0 |

This liquid crystal material had good dielectric properties, including anisotropy (Δε) of −1.1 to +1.2, and a cross-over frequency of 1.0 kHz at 26° C.

Formula If Compounds

As previously mentioned, unexpectedly superior properties are possessed by compounds according to the formula:

(If)

wherein each of R and R', which may be the same or different, is a straight alkyl. The alkyl may have 1–10 carbon atoms, the most useful compounds having alkyls with 2–7 carbon atoms. As illustrated in FIG. 4, compositions of Formula If have a substantially lower cross-over frequencies than other cyclohexyl compounds of Formula I, all of which are very similar in cross-over frequency.

Compounds of this formula, heretofore unknown, are synthesized according to the following steps:

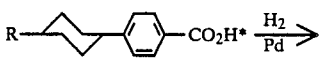

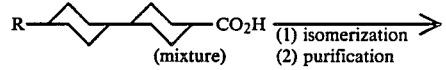

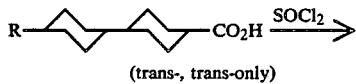

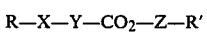

*from Angew. Chem., 16, 100 (1977)

EXAMPLE 3

An example is the synthesis of:

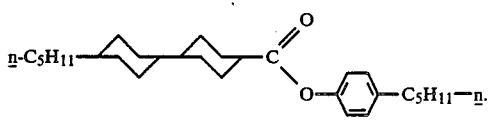

The acid n-$C_5H_{11}$—  —$CO_2H$ was added to 50 ml of toluene. To this mixture was added 10 ml of thionyl chloride and the solution was refluxed with the solvent and the residue was dissolved in 10 ml of benzene. To this mixture was added 1.0 g of pentylphenol. One milliliter of pyridine was added dropwise with shaking and the reaction mixture was stirred overnight at room temperature.

The mixture was then diluted with 50 ml of toluene and washed with 50 ml of ten percent hydrochloric acid to remove the pyridinium salt. After two washings with water, the organic layer was dried over magnesium sulfate overnight.

The crude ester was dissolved in 20 ml of a solvent mixture of five percent ethyl acetate in hexanes and injected onto a silica gel column of Waters Preparative Liquid Chromatograph using the same solvent system. After evaporation of the solvent from the collected fraction, the residue was recrystallized twice from a THF-methanol solvent. A yield of 0.6 g was obtained.

While I have described several embodiments of my invention, it will be apparent to those persons skilled in the art that many other changes and modifications may be made without departing from my invention in its broader aspects. The appended claims are to cover all such changes and modifications as come within the true spirit and scope of my invention.

I claim:

1. A twisted nematic liquid crystal material suitable for use in a dual-frequency addressable liquid crystal cell, the material consisting essentially of:
   (a) a base mixture consisting of at least two different base substances selected from the group of monoester compounds having the formula:

R—X—Y—$CO_2$—Z—R' wherein each of R and R', which may be the same the different, is an alkyl having 2-7 carbon atoms, and wherein each of X, Y and Z, which may be the same or different, is a member selected from the group consisting of phenyl and trans-cyclohexyl, at least one of X, Y, and Z being cyclohexyl;

(b) up to ten weight percent of an additive component that has a strong, positive dielectric anisotropy and is suitable to lower the cross-over frequency of the base mixture; and (c) up to twenty-five weight percent of a dopant to reduce the viscosity and melting point of the base mixture.

2. The liquid crystal material of claim 1 wherein the base mixture is an eutectic mixture of said base substances.

3. The liquid crystal material of claim 1 being composed such that the material, when used in a dual-frequency addressed liquid crystal cell, can be switched between off and on conditions in not more than one millisecond.

4. The liquid crystal material of claim 1 being composed such that the mixture has a crossover point of less than ten kHz so that the material when used in a dual-frequency addressable liquid crystal cell, can be switched between off and on conditions without the production of an appreciable amount of heat.

5. The liquid crystal material of claim 1 wherein the base mixture consists of at least two and not more than five base substances.

6. The liquid crystal material of claim 5 wherein each base substance is a compound having a trans-cyclohexyl ring.

7. The material of claim 1 comprising not more than five different monoester compounds of the group.

8. A dual-frequency addressable liquid crystal cell including a spaced-apart pair of electrodes addressable by control means for applying an electrical signal thereto, a body of liquid crystal material disposed between the electrodes, said material consisting essentially of (a) a base mixture of at least two different base substances selected from the group of monoester compounds having the formula:

R—X—Y—CO₂—Z—R' wherein R and R' are the same or different straight chain alkyl compounds having 2-7 carbon atoms, and wherein X, Y and Z are the same or different members of the group consisting of phenyl and trans-cyclohexyl, at least one of X, Y and Z being cyclohexyl, (b) up to ten weight percent of at least one additive having the formula

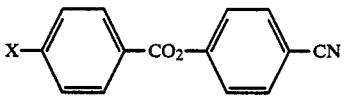

wherein X is selected from the group consisting of

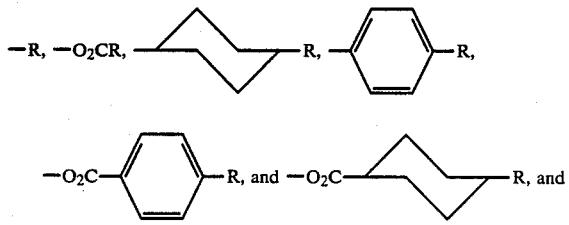

wherein R is a straight chain alkyl having 2-7 carbon atoms; and (c) up to twenty-five weight percent of at least one dopant of the groups having the formulas

and

R—X—CO₂—Y—R' wherein R and R' are the same or different straight alkyl having 2-7 carbon atoms, and wherein X and Y, which may be the same or different, each is a member selected from the group consisting of phenyl and cyclohexyl.

9. The liquid crystal cell of claim 8, wherein said base mixture is a eutectic mixture.

10. The liquid crystal cell of claim 8, wherein said base mixture consists of not more than five different base substances.

11. The liquid crystal cell of claim 8, wherein each base substance is a compound having a trans-cyclohexyl ring.

12. The liquid crystal cell of claim 8, wherein said material has a characteristic crossover frequency of less than ten kHz.

13. The liquid crystal cell of claim 12, wherein said material is composed of molecules that, within one millisecond after an electrical signal of predetermined frequency below the crossover frequency is applied across said electrodes, align perpendicular to the plane of the electrodes, and that align parallel to the plane of the electrodes when an electrical signal above the crossover frequency is applied.

* * * * *